L. BERG.
TRACTION DEVICE FOR VEHICLE WHEELS.
APPLICATION FILED SEPT. 7, 1916.
1,275,369.
Patented Aug. 13, 1918.
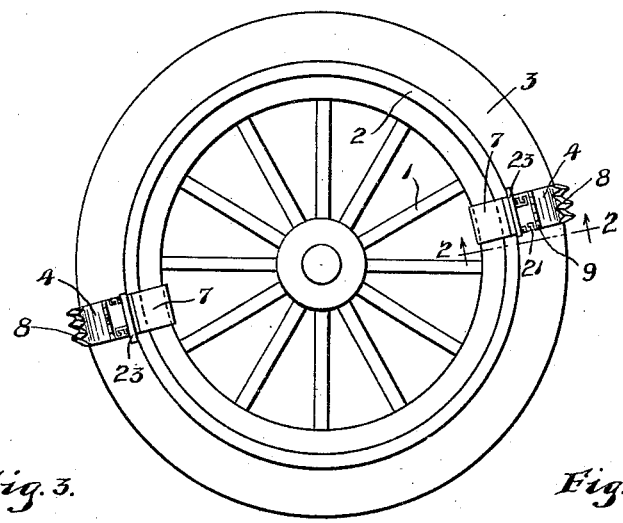
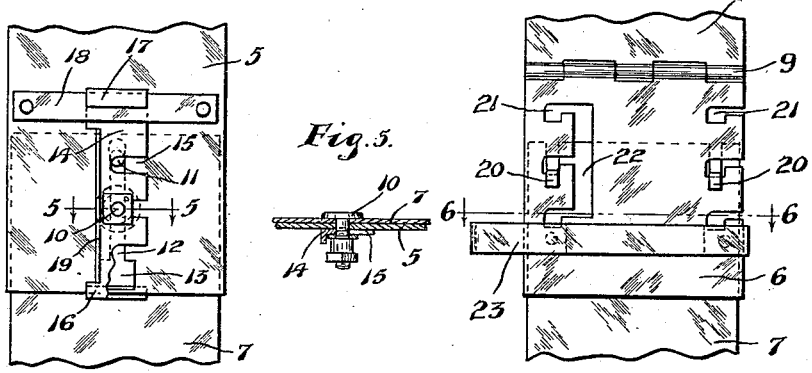
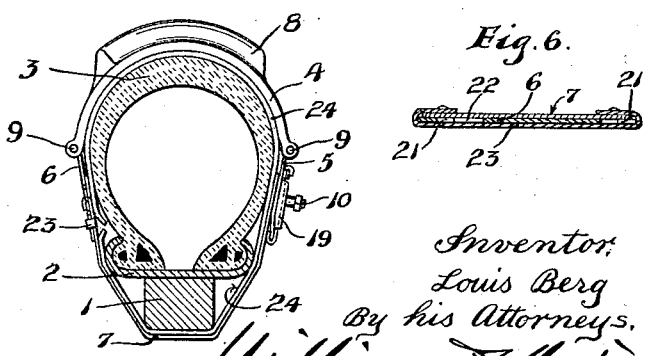
Witnesses.
H. L. Opsahl.
E. C. Wells
Inventor,
Louis Berg
By his Attorneys,
Williamson & Merchant

UNITED STATES PATENT OFFICE.

LOUIS BERG, OF TAYLOR FALLS, MINNESOTA, ASSIGNOR, BY DIRECT AND MESNE ASSIGNMENTS, TO HARM ROSE, OF ROSEMONT, NEBRASKA.

TRACTION DEVICE FOR VEHICLE-WHEELS.

1,275,369.   Specification of Letters Patent.   Patented Aug. 13, 1918.

Application filed September 7, 1916.   Serial No. 118,851.

*To all whom it may concern:*

Be it known that I, LOUIS BERG, a citizen of the United States, residing at Taylor Falls, in the county of Chisago and State of Minnesota, have invented certain new and useful Improvements in Traction Devices for Vehicle-Wheels; and I do hereby declare the following to be a full, clear, and exact description of the invention, such as will enable others skilled in the art to which it appertains to make and use the same.

My invention relates to traction devices for vehicle wheels; and, to this end, it consists of the novel devices and combinations of devices hereinafter described and defined in the claims.

In the accompanying drawings, which illustrate the invention, like characters indicate like parts throughout the several views.

Referring to the drawings,

Figure 1 is a side elevation of a vehicle wheel equipped with a pneumatic tire and having two of the improved traction devices secured thereto;

Fig. 2 is a view partly in elevation and partly in transverse section taken on the line 2—2 of Fig. 1;

Fig. 3 is a fragmentary detail view of the right side of the traction device, as shown in Fig. 2;

Fig. 4 is a fragmentary detail view of the left side of the traction device, as shown in Fig. 2;

Fig. 5 is a detail view, principally in transverse section taken on the line 5—5 of Fig. 3; and Fig. 6 is a transverse section taken on the line 6—6 of Fig. 4.

The numeral 1 indicates an automobile wheel having a rim 2 equipped with a pneumatic tire 3. The traction device is in the form of a collar adapted to be secured around the felly, rim and tire of the wheel between any two of the spokes thereof. This traction device comprises a tread plate 4, clamping plates 5 and 6 and a felly yoke 7. The tread plate 4 is formed to fit the tread surface of the casing of the tire 3 and has integrally formed therewith a plurality of traction lugs 8 which, as shown, extend diagonally thereacross. The tread plate 4 and its traction lugs 8 may be of cast or pressed metal. Hinge joints 9 connect the clamping plates 5 and 6 to the tread plate 4 and, as shown, extend the full width thereof. The felly yoke 7 is bent to fit over the felly of the wheel and rim 2.

The clamping plate 5 is separably and adjustably connected to one end of the felly yoke 7 by a nut-equipped clamping bolt 10. This clamping bolt 10 is inserted through anyone of a plurality of longitudinally spaced bores 11 formed in the felly yoke 7 with its head bearing against the inner face of said yoke. The body of the clamping bolt 10 extends loosely through a longitudinal slot 12 formed in the clamping plate 5 with freedom for sliding movement therein. It will be noted that the inner end of the slot 12 terminates in an expanded opening 13 to pass the nut of the clamping bolt 10, during the hinged movement of the clamping plate 5, with respect to the felly yoke 7. A lock plate 14 on the clamping plate 5 is provided for holding the clamping bolt 10 in different longitudinal adjustments in the slot 12. This lock plate 14 has in one of its longitudinal edges a multiplicity of notches 15, any one of which will embrace the clamping bolt 10, just under its nut, by an edgewise movement of said lock plate. The lock plate 14 is secured to the clamping plate 5, for sliding movement transversely thereof, by forming on its ends hooks 16 and 17, the former of which interlocks with the free end of the clamping plate 5 and the latter of which interlocks with a metal strap 18. This strap 18 is riveted to the clamping plate 5 and overlaps the lock plate 14. A finger piece 19 is formed on the lock plate 14 and by which the same may be operated.

The felly yoke 7 is adjustably connected to the clamping plate 6 by a multiplex bayonet joint comprising a pair of studs 20 on said felly yoke and two series of slots 21 in said clamping plate. One series of these slots 21 extend through the adjacent longitudinal edge of the clamping plate 6 and the other series thereof are connected by a slot 22. A metal strap 23, bent to form a loop, is secured to the felly yoke 7, embraces the clamping yoke 6 and holds the same against lateral separation from the felly yoke 7, but with freedom for endwise and edgewise movements to permit the movement of the studs 20 into and out of the different opposite pairs of the slots 21.

To prevent the traction device from cutting the tire 3 or marring the wheel, a facing 24 of rubber, fabric or other suitable material is interposed therebetween.

By adjusting the clamping plates 5 and 6 on the felly yoke 7, the improved traction device may be made to fit different sized wheels and tires. After one of the traction devices is once fitted to a wheel, the adjustment thereof need not be changed.

In applying the traction device to a wheel, the fastening means between the clamping plate 5 and felly yoke 7 is first released to permit the tread plate 4 to be opened on the hinge joint 9. With the tread plate 4 in open position, the felly yoke 7 may be applied in position on the felly 1. The tread plate 4 is then turned into position onto the tire 3 and the clamping plate 5 folded onto the adjacent end of the felly yoke 7. In folding the clamping plate 5 onto the felly yoke 7, it is necessary to have the device sufficiently loose to permit the nut on the bolt 10 to pass through the aperture 13, in order that the said bolt may enter the slot 12. Then by sliding the clamping plate 5 and felly yoke 7, the one upon the other, the device may be tightly fitted in position on the felly and tire. While the device is thus held, the lock plate 14 is moved edgewise to move one of its notches 15 into interlocking engagement with the clamping bolt 10. The tightening of the nut on the clamping bolt 10 will frictionally clamp the lock plate 14 on the clamping plate 5 and thereby prevent displacement thereof.

From the above description, it is evident that the improved traction device may be very quickly and easily applied to a wheel or removed therefrom. It is also evident that one or more of the traction devices may be applied to a wheel, irrespective of the position thereof, for instance, if the wheel is stuck in a mudhole, rut, loose sand or snow.

What I claim is:—

1. A traction device for vehicle wheels comprising a lug-equipped tread plate, two clamping plates hinged to the sides of the tread plate, a felly yoke overlapping the clamping plates, and means adjustably and independently connecting the clamping plates to the felly yoke.

2. A traction device for vehicle wheels comprising a lug-equipped tread plate, a clamping plate hinged to the tread plate, a felly yoke secured to the tread plate and overlapping the clamping plate, and means adjustably connecting the overlapped clamping plate and felly yoke, said means comprising a clamping bolt secured to the felly yoke and having sliding movement in a longitudinal slot in the clamping plate, and a lock plate for securing the clamping bolt in different adjustments in said slot.

In testimony whereof I affix my signature in presence of two witnesses.

LOUIS BERG.

Witnesses:
 A. H. LINDQUIST,
 AUGUST CONRAD HARN.

Copies of this patent may be obtained for five cents each, by addressing the "Commissioner of Patents, Washington, D. C."